United States Patent [19]

Summer, Jr. et al.

[11] 4,414,624

[45] Nov. 8, 1983

[54] MULTIPLE-MICROCOMPUTER PROCESSING

[75] Inventors: Charles F. Summer, Jr., Orlando, Fla.; Robert O. Pettus; Ronald D. Bonnell, both of Lexington, S.C.; Michael N. Huhns, Irmo, S.C.; Larry M. Stephens, Columbia, S.C.

[73] Assignee: The United States of America as represented by the Secretary of the Navy, Washington, D.C.

[21] Appl. No.: 208,355

[22] Filed: Nov. 19, 1980

[51] Int. Cl.$^3$ .................................. G06F 13/00
[52] U.S. Cl. ........................................ 364/200
[58] Field of Search ........................ 364/900, 200

[56] References Cited

U.S. PATENT DOCUMENTS

| 3,445,822 | 5/1969 | Driscoll | 364/200 |
|---|---|---|---|
| 3,593,300 | 7/1971 | Driscoll et al. | 364/200 |
| 4,096,567 | 6/1978 | Millard et al. | 364/200 |
| 4,214,305 | 7/1980 | Tokita et al. | 364/200 |
| 4,219,873 | 8/1980 | Kobert et al. | 364/200 |
| 4,253,146 | 2/1981 | Bellamy et al. | 364/200 |

OTHER PUBLICATIONS

Chen, B. Y., "Microcoding a Bit-Slice Super Minicomputer," Proceedings of the Southeastcon 1980, Apr. 1980.
Pettus, R. O., "Multiple Microcomputer Control Algorithm," Technical Report Navtraequipcen 78-C-01-57-1, Sep. 1979.
Avila, J., "Memory Alignment Controller for a Bit-Slice 32-Bit Computer" Proceedings of Twelfth Annual Southern Symposium on System Theory, May 1980.

*Primary Examiner*—Jerry Smith
*Assistant Examiner*—Michael R. Fleming
*Attorney, Agent, or Firm*—Robert F. Beers; Robert W. Adams

[57] ABSTRACT

The architecture of a special-purpose multiprocessor, hierarchically structured and functionally distributed, having ditributed cache memory for local processing and a common applictions task manager in each microcomputer. A group of identical microcomputers execute the total program in an intrinsically parallel mode within the frame times scheduled by a system state control microcomputer.

8 Claims, 6 Drawing Figures

MULTIPLE-MICROCOMPUTER PROCESSING

BACKGROUND OF THE INVENTION

Much of the previous work in multiprocessor systems has addressed the problems of allocating system resources in a general-purpose computing environment. In these systems the computational requirements change as a function of time as various tasks use different resources in a random manner. The present invention involves an application of multiprocessor capabilities to a fundamentally different problem in which the computational load is essentially independent of time. Such applications occur in process control, in simulations of physical systems and where digital computers are embedded in systems. The computations in these applications are repetitive in that a certain number of calculations are required to move the system from one finite state to the next. Computations for one state must be completed before calculations for the next state may begin. This requirement imposes a structure on the computational load because it is known in advance which computational tasks must be completed before the system moves to the next state.

A multiprocessor system architecture is utilized in order to exploit the capabilities offered by parallel processing. A single processor computer system may not complete computations quickly enough to provide real-time responses, especially when a large number of features are included in the system model. Partitioning the program into parallel processible units and using a multiprocessor system is a method of obtaining the required computational speeds. However, once a program has been partitioned, a problem of communication among the processors is introduced, a problem compounded by the highly-coupled structure of many real-time system models. If the multiprocessor system is to be effective, communication of data from one processor to another must be optimized so that needed data can be passed with minimum delay to other processors.

One way to ameliorate the communications problem is to minimize the transmission of control information. This can be accomplished by distributing portions of the control function of the system to individual processors. These operate autonomously from the system control processor. Performance analysis centers around the concept of the speed-up factor, a ratio of the computation time required in a single processor to that in a multiprocessor system.

The architecture selected for the multiprocessor system described herein is unique. All processors are fundamentally identical, although one is given overall system control responsibility by virtue of its priority. Each processor has a dedicated local memory for program and operating system storage. Communications among processors are handled via a shared memory.

SUMMARY OF THE INVENTION

The present invention is the result of a new concept of applying microcomputer technology to real-time trainers. Fundamentally, the concept involves partitioning the trainer program into modules and dedicating the processing of each module to a separate microcomputer. A group of identical microcomputers execute the total program in an intrinsically parallel mode within the frame times scheduled by a system state control microcomputer. Since the execution of a real-time trainer program is a highly iterative process, groups of the application microcomputers are scheduled by the control computer according to the processing required for a specific time frame.

At the beginning of each frame time the system control microcomputer transmits a time control word to all microcomputers to establish the time available for processing during that or the following frame. Each microcomputer has microcoded in its control store an applications task manager (ATM). The ATM is the local state controller for each microcomputer and is a very compact and highly efficient executive routine. The ATM is identical in all microcomputers.

Each separate microcomputer has its own dedicated memory space, and local memory. Within this total space are certain addresses that are logically assigned to a small special store, or memory. This separate store at each microcomputer can be written into by all other microcomputers that generate intermediate results whose destination store address is within that assigned to this store. This special store will be called a distributed cache. It provides a capability of any microcomputer to globally write to any or all other special stores simultaneously, and each separate microcomputer can read from its distributed cache in a local mode. The distributed cache concept reduces the data bus bandwidth and data bus contention by a significant degree. Bus deadlock is prevented by bus access manager (BAM) logic that is a circular priority recognizer. Each microcomputer that requests the data bus obtains access and control if the request differs by one clock period from another request.

DESCRIPTION OF A PREFERRED EMBODIMENT

Figure 1:
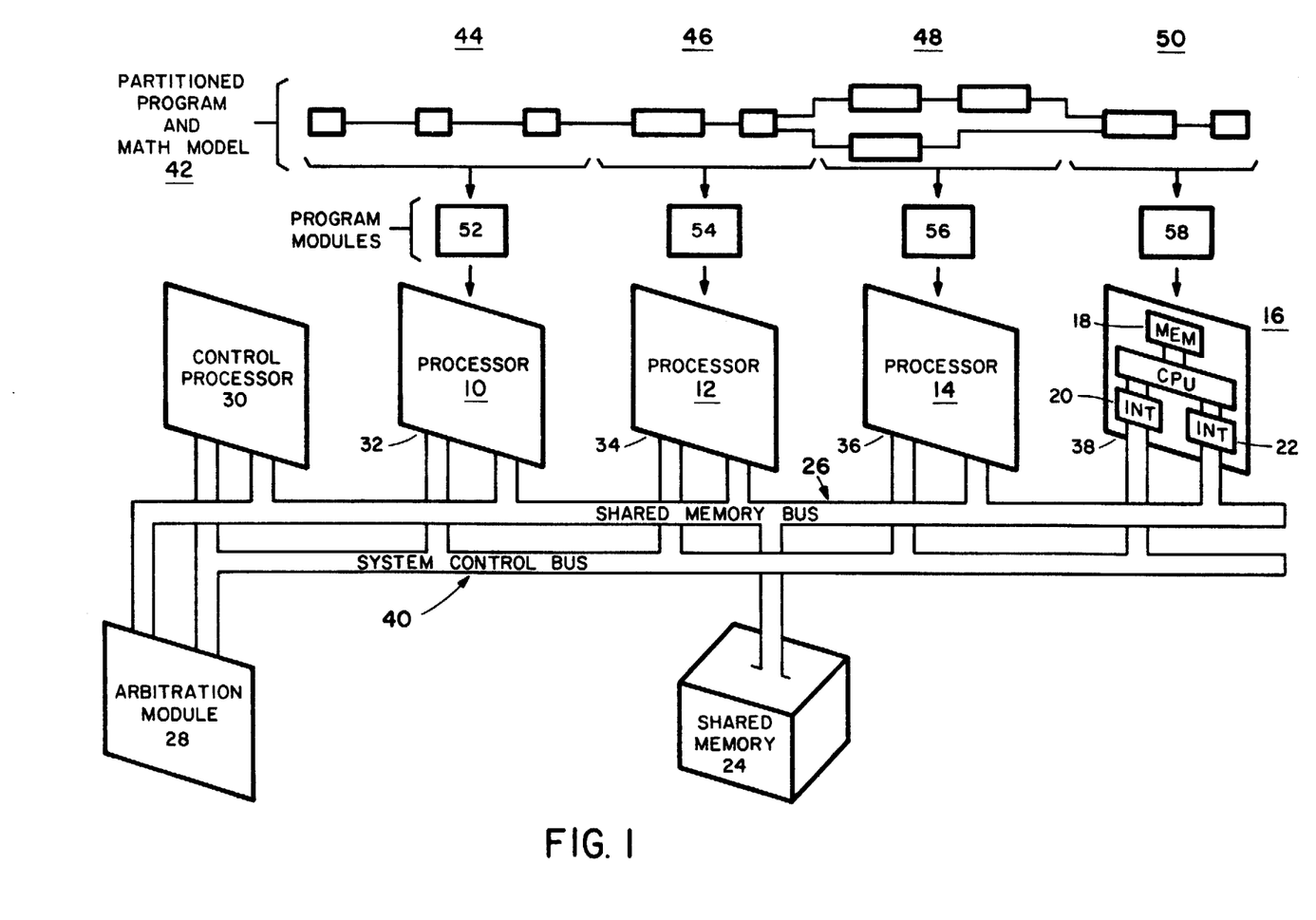
FIG. 1 is a block diagram of a preferred embodiment of the present invention, also showing the emulation of a processing system employing the concept formulated in the invention.

A hierarchically structured and functionally distributed special-purpose multiprocessor is shown in the FIG. 1. The operating system is a multilevel structure implemented in an optimal combination of hardware, firmware, and software. This architecture is suited to any application, such as process control or real-time system simulation, in which the basic computational tasks are dedicated and do not change in time.

Each processor has a dedicated memory space in which program tasks are stored. In addition, there is a system bus to a global memory which is used primarily for communication among the processors. To minimize contention for this system bus, selected areas of global memory are duplicated at each processor. This allows the processor to obtain needed information by using a local bus rather than the global, system bus. All write operations to the shared memory are global and the information is duplicated at processors having shared memory at that address. Read operations then become primarily local and can occur in parallel.

Control functions are distributed among the processors; the scheduling and execution of control and application tasks are governed at each processor level by a local, real-time executive. This executive may be implemented primarily in firmware to minimize overhead. However, the control structure is designed to be independent of implementation so that a variety of processors can be utilized together. Moreover, it is possible to add to each processor an additional subprocessor which implements the executive in hardware.

Each processor 10-16 has its own local memory 18 and I/O interfaces 20 and 22, as required. In addition, each processor has access to global shared memory 24. Access to shared memory bus 26 is controlled by bus arbitration module 28 which implements a multiple-priority, daisy-chained structure. Arbitration is overlapped to provide maximum bus utilization. The control processor 30 occupies the position nearest the arbitration module, giving it the highest priority at each level. Each processor has a control port 32-38 which is accessed by the control bus. No arbitration is required for this bus as only control processor 30 may act as the bus master.

The key to successful operation of a multiple-instruction-stream, multiple-data-stream (MIMD) computer is effective communication among the processors. There are two system buses—one for communicating data (26) and the other for communicating control information (40)—which are common to all of the processors. The most critical system resources are these global buses which, by being shared by all of the processors, become the limiting factor in the overall performance of this multiple-computer system. It is thus crucial that the design and utilization of these buses be optimized.

The architecture of the entire system can be designed to minimize bus usage. Most of the system control functions are distributed among the processors and are handled by the local executive. Also, because the programs to be executed are fixed, each processor is assigned its function in advance. Hence, although processor 30 is designated as a control processor, it needs to communicate only a minimum of control information during normal system operation. This control information is transmitted on control bus 40 so as not to interrupt the data flow on the other bus.

One way for processors to communicate is by writing messages and results into a shared memory where other processors can access this information. For the MIMD system described herein, all of the system memory is distributed among the processors. Part of the memory for each processor is local and can be accessed only by that processor. This allows most run-time memory operations to be local, thereby avoiding contention for the global buses. The rest of a processor's memory is global and available to all processors for memory-write operations. This global portion is designed in a dual-port configuration so that it can be read locally while being written globally. Also, all processors can read in parallel without any possibilities for contention or deadlock. By removing all global read operations from the bus, the bus traffic is reduced by much more than half.

As an example of this reduction, if a parameter calculated by one processor is needed by four other processors, a simple shared memory would handle this transfer in five cycles (one to write and four to read). With the shared memory duplicated at each processor, only one cycle is required to simultaneously write the parameter to all processors which need it. The destinations for a parameter are determined by its location in the memory address space. The read operations then occur locally and independently.

The utilization of the bus 26 can be further minimized because the system is to be used for a single dedicated application. The program 42 for this application is partitioned 44-50 into tasks 52-58 and assigned to processors for execution in a way that minimizes the interprocessor communications. Also, the communications are scheduled in advance to minimize idle period for the bus and wait periods for processors.

For the multiple-microcomputer system presented, a cycle is the time allowed to complete a *write* plus a *read* on the global shared-memory bus. During each cycle, a set of calculations is also performed by the individual processors. The physical sampling period which consists of several cycles is a function of the significant highest natural frequency of the system being simulated. The sampling period is established by the control processor for all applications processors. Because the total computation is performed by a repetitive sequence of cycles, the speed-up ratio which is a system efficiency measure is based on only one cycle.

The concept formulated in terms of the present invention will now be reiterated, and expanded. The architecture is a hierarchically structured and functionally distributed type. Its operating system is a multilevel structure implemented in an optimal combination of hardware, firmware, and software. This architecture is suited to any application, such as process control or real-time system simulation, in which the basic computational tasks do not change in time.

Each processor 10-16 has a dedicated memory space 18 in which program tasks are stored. In addition, there is a system bus 26 to a global memory 24 which is used primarily for communication among the processors. To minimize contention for this system bus, selected areas of global memory are duplicated at each processor. This allows the processor to obtain needed information by using a local bus rather than the global, system bus 26. All write operations to the shared memory are global and the information is duplicated at processors having that address. Read operations then become primarily local and can occur in parallel.

Control functions are distributed among the processors; the scheduling and execution of control and application tasks are governed at each processor level by a local application task manager (ATM)) that is a very simple but efficient real-time operating system. This ATM is implemented primarily in firmware to minimize overhead. However, the control structure is independent of implementation so that a variety of processors can be utilized together.

The embodiment shown is designed to simulate in real-time a physical process such as the flight characteristics of a complex aircraft for training. This process has a large but finite number of state variables which must be updated periodically. The overall program is fixed once the system model is determined; only the state variables change in time. Because the fundamental process being modeled does not change, the program which implements the model also does not change.

In a flight simulator such as a real-time trainer, the state variables are updated at a rate determined by the dynamics and outputs of the system being simulated. If at $t=T_0$ a trainee pulls back on a simulator control yoke, then at $t=T_0+\Delta t$, one sampling time later, the simulator cockpit must be moved accordingly. The computations which carry the simulator from one state to the next can be decomposed as a four-fold process.

First, the sampled input parameter is mapped into a change in elevator position. This change is called the update state calculation and must be communicated to all those processors making calculations which depend on it. Secondly, the next state is calculated based on the present value of the state parameters, such as velocity and wind direction, and any other changes in input parameters.

The third step in the process consists of computing output quantities such as changes in cockpit position and instrument readings. In the fourth cycle, the output values are transmitted to the simulator mechanism and, in this example, the cockpit moves in response to the change in control yoke position.

The common bus structure shown in the FIG. 1 is most desirable for the application described here because this structure provides a means of orderly communications between processors. The shared-memory method of communications strategy allows all communications to occur without the cooperation of the processors involved. A processor may send its newly calculated parameters to shared memory whenever the bus is available. It need not wait until the recipient processor is ready to receive that data. This can be a significant advantage if, for example, the calculations of one processor are required by several others. The same advantages occur when a processor requires information from another processor.

Coordinating the processors 10-16 and insuring that computations are not started until all updated data are available is the task of the ATM in each processor.

Successful operation of the multiple-instruction-stream, multiple-data-stream (MIMD) couputer occurs with effective communications among the processors. There are two system buses—one for communicating data, shared memory bus 26, and the other for communicating control information, system control bus 40—which are common to all of the processors. A critical system resource is these global buses which, by being shared by all of the processors, become a limiting factor in the overall performance of this multiple-computer system architecture. It is thus that the design and utilization of these buses are to be optimized.

The architecture contemplates that bus usage be minimized. Most of the system control functions are distributed among the processors by providing each with its local applications task manager (ATM), an executive. Also, because the programs to be executed are fixed, each processor is assigned its application function in advance. Hence, although one processor is designated as a control processor 30, it needs to communicate only a minimum of control information during normal system operation. This control information is transmitted on control bus 40 so as not to interrupt the data flow shared memory bus 26.

One way for processors to communicate is by writing messages and results into a shared memory where other processors can access this information. For the present invention, all of the system memory is distributed among the processors 10-16. Part of the memory for each processor is local and can be accessed only by that processor. This allows most runtime memory operations to be local, thereby avoiding contention for the global buses. The rest of a processor's memory is global and available to all processors for memory-write operations. This global portion is designed in a dual-port configuration so that it can be concurrently read locally while being written globally. Also, all processors can read in parallel without any possibilities for contention or deadlock. By removing all global read operations from bus 26, the bus traffic is reduced by much more than half.

As an example of this reduction, if a parameter calculated by one processor is needed by four other processors, a simple shared memory would handle this transfer in five cycles (one to write and four to read). With a portion of the shared memory duplicated at each processor (specific address spaces), only one cycle is required to simultaneously write the parameter to all processors which need it. The destinations for a parameter are determineed by its location in the memory address space. The read operations then occur locally and independently. Typically, shared memory of a flight trainer has an address space of approximately 8K words.

Synchronous operation maximizes the bandwidth of the global data bus. This reduces the overhead associated with each data transfer and allows most data transfers to be scheduled.

The application task manager (ATM) is identical in all processors. The local ATM has two major functions: it implements a virtual machine structure and handles the chores normally associated with a real-time task manager. In addition, it isolates a programmer from the details involved in the passing of parameters between tasks.

An individual processor, processor 16, for example, may communicate with the rest of the system via the system buses, or with an external device via input-output (I/O) interface bus 22. The external communications are controlled by the programs executing in each processor but all interprocessor communications are handled by a virtual machine implemented by the local operating (ATM) 20. Use of the virtual machine removes much of the system dependence on any hardware characteristics of the individual processors. Virtual system structure 18-22 is symmetrical in that the interface between the control program and the individual processors is the same as the interface between these processor programs and external devices. In addition, the interface between the control processor and the external world is handled by the virtual machine in the same manner as for the interface between the other processors and the system bus. This structure increases the extensibility of the system, allowing more than one system of multiple processors to be linked together.

The machine has five states: HALT, WAIT, COMMUNICATION, EXECUTIVE, and USER. The HALT state is used to take a processor off-line for an indefinite length of time. The WAIT state is similar to the HALT state but is used for synchronization. A common control line can cause all waiting units to enter the EXECUTIVE state simultaneously. Most of the normal operating system activities, such as the scheduling of tasks, take place in the EXECUTIVE state. The USER state is used to run the actual programs.

Entry to the operating system is by a software or hardware interrupt. The interrupt handler has a structure which is similar to that of the CASE statement. This allows the operating system to have a one-in, one-out structure even though there are multiple interrupts.

Normally control is passed to the scheduler; however, under some conditions an exceptional task may be activated. Exceptional tasks include the following: supervisor-call handler; error handler; initialization procedure; communications, halt and wait states of the virtual machine.

The supervisor-call handler is a mechanism which provides system services to the executing programs. The supervisor calls allow scheduling of tasks, time management, and intertask communications control. Semaphore and message buffers are available as supervisor calls and are the main techniques used for intertask communications and control. In addition, flags may be used to implement a conditional critical region. Executing programs issue supervisor calls by using software interrupts.

The occurrence of an error, such as an attempt to address nonexistent memory or to divide by zero, causes a trap which activates the error handler. The error handler prepares a message, with information such as the machine state and identity of the active task, and passes control to the communications state where the message is then sent to the control processor. The task may or may not be restarted, depending upon the severity of the error.

The communications state is used for the transmission of programs, data, and control information between the control processor and other system processors. All messages sent to a processor in the communications state are interpreted by the virtual machine. The control processor does not have to be involved with any hardware details of the processor with which it is communicating.

The scheduler uses single-level dynamic priority assignment and preemptive scheduling with resumption. The three main components of the scheduler are the event queue handler, the system program handler, and the application task scheduler. The event queue is the mechanism used to handle all events scheduled to occur either at some specific time or after an elapsed time. When an event timer interrupt occurs, the event queue handler is flagged to run by the interrupt handler. When the scheduler is entered, the task at the top of the event queue is activated. This insures only that the task can compete for processor time, not that it will run.

System programs implement operating system functions that are matched to a particular application. The programs are executed until completed whenever they are scheduled. The application task scheduler compares the priority of the currently active task, if any, with the highest priority task in the queue. The higher priority task is scheduled and control is passed to that task. If there are no currently active tasks a diagnostic program is run.

The ATM (local operating system) is intended to work on a wide variety of processor types.

How well the processing power of a multiple-computer system can be utilized, its efficiency, is a function of three major factors: the organization and architecture of the system, the number and power of the individual processors, and the type of application program.

For the multiple-computer system architecture presented herein as an embodiment, a cycle is the time allowed to complete a *write* (W), a *read* (R) on the global shared-memory bus, plus a set of state calculations by the individual processors. The physical sampling period ($T_{SAMPLE}$) is a function of the significant highest natural frequency of the system being simulated. The sampling period consists of several cycles, as it will normally require several cycles to perform the required calculations that must be completed during each sampling period. Because the total computation is performed by a repetitive sequence of cycles, the speed-up ratio is based on only one cycle.

In a multiple-computer system which has n individual processors and a total computational load of M tasks where a task is a self-contained portion of this load, once a task is initiated it can be completed without the need for additional inputs. If the average computation time for one task is denoted by $T_A$, and the average time for data exchange on the shared-memory bus per task with only global shared memory is denoted by $T_C$, the average time for data exchange on the shared-memory bus per task with both local and global shared memory, $T_C'$, is $T_C' = kT_C$, where k is the local shared memory factor ($0 < k < 1$). A lower (but not the least lower) bound for k is $1/n - 1$. But, $T_C'$ is not explicity a function of n, k is a function of the system partitioning. If $k = 1$, that would mean that there is no local shared memory and shared variables are communicated only through a global shared memory. For $k < 1$ the average time for data exchange on the shared-memory bus is reduced by the presence of the local shared memory.

The average processor utilization for computation is $$\alpha = \frac{T_A}{T_M}, (0 < \alpha < 1),$$

where $T_M$ = the maximum time allowed for computation.

The speed-up ratio for the multiple-computer system with distributed control, $\beta_d$, is $$\beta_d = \frac{T_S}{T_{Pd}} = \frac{1}{\frac{1}{n\alpha} + \frac{T_c}{T_A}},$$

where the execution time needed for sequential computation of M tasks is $T_S = MT_A$, and the parallel computation time for M tasks by a multiple-computer system with distributed control is, $$T_{Pd} = MT_C + \frac{M}{n\alpha}.$$

The maximum speed-up factor is $$\beta_d = \frac{T_A}{T_C}.$$

The speed-up ratio for the multiple-computer system without distributed control, $\beta_{\bar{d}}$, is $$\beta_{\bar{d}} = \frac{MT_A}{T_D + MT_C + \frac{M}{n\alpha} T_A},$$

where $T_D$ = duration of control phase.

The speed-up ratio for the multiple-microcomputer system is improved by the factor, $\gamma$, with the use of distributed control.

$$\gamma = 1 + \frac{T_D}{MT_C + \frac{M}{n\alpha} T_A},$$

where $T_D$=duration of control phase. p The speed-up factor for the multiple microcomputer system with distributed control and with local shared memory is, $$\beta_d{}^w = \frac{1}{\frac{1}{n\alpha} + \frac{kT_c}{T_A}} \quad (0 < k < 1).$$

The speed-up factor for the system with local memory is improved by the amount $\sigma$ through the use of local shared memory and distributed control, $$\sigma = \frac{(1 + C)}{(1 + KC)}$$

where $C = n\alpha(T_C/T_A)$.

Limiting the use of the special-purpose multiprocessor to a single class of applications such as real-time trainers or process control allows it to be optimized with respect to the use of critical system resources. This optimization consists of distributing the system control functions to individual processors by implementing a local ATM in each processor (real-time operating system), distributing copies of the system shared memory to each processor so that all system write operations are global and all system read operations are local and parallel, scheduling the communications that occur on the synchronous data bus, and partitioning the program tasks to minimize interprocessor communications. The resultant system has a significant speed-up factor versus a single general purpose processor system.

An implementation embodiment of the present invention to emulate a VAX-11/780 computer is described in the Proceedings of the SOUTHEASTCON 1980, April 1980, within contributions entitled, "Hardware Design of a Bit-Slice Processor," and "Microcoding a Bit-Slice Super Minicomputer"; and, in the Proceedings of the Twelfth Annual Southern Symposium on System Theory, May 19-20, 1980, within the article entitled, "Memory Alignment Controller for a Bit-Slice 32-Bit Computer", all of which is incorporated herein by reference as non-essential subject matter. In addition, the concept formulated in the present invention is described in "Multiple Microcomputer Control Algorithm," a technical report designated 78-C-0157-1 in accordance with U.S. Navy Contract N61339-78-C-0157, which likewise is incorporated herein by reference as non-essential subject matter, wherein the essential subject matter of the report is provided in the following description expressed in details that are exemplary of the multiple microcomputer control system (MMCS).

Figure 2:
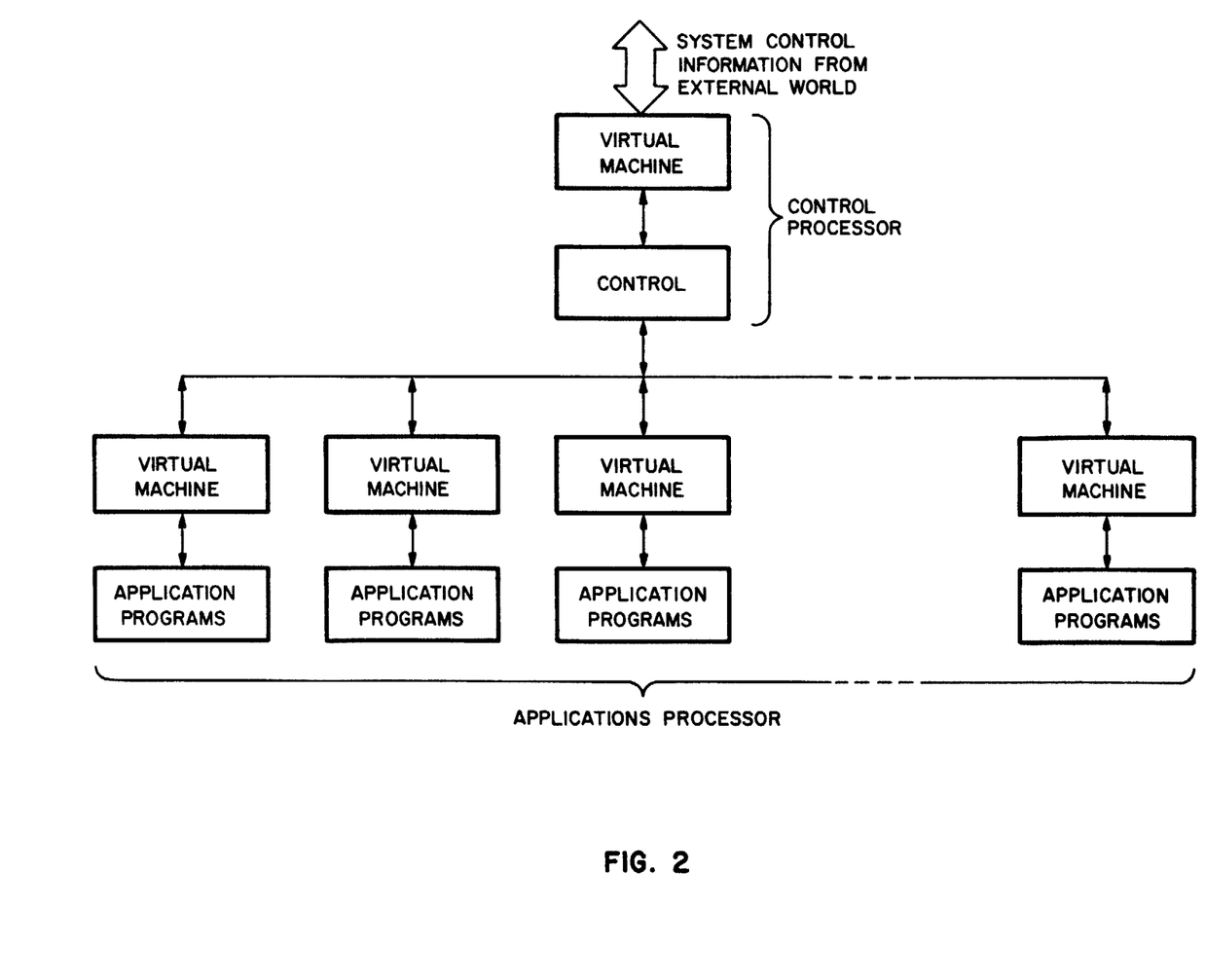
FIG. 2 is a block diagram showing the hierarchial organization of a preferred embodiment.

The control processor and the virtual machines of the other processors form a hierarchial structure. For the system as a whole the control processor presents the same external functional appearance as the virtual machines of the other modules. This allows the system to be expanded to a new layer if desired. This structure is illustrated in FIG. 2.

Bus Structure. The shared memory bus is used by all processor modules to reference shared memory. Because the shared memory is considered to be a critical region, the shared memory bus can be used by only one processor at a given time. The processor modules acquire the bus according to a priority scheme to be described later. Data transfers on the shared memory bus are synchronous once the bus is acquired. This gives the highest possible throughput but requires that the memory response be able to match the processor cycle time. A wait line can be provided to allow the use of slower memory if desired.

The control bus is a single-master bus used by the control processor for all system control functions. While all processor modules are identical, only one processor can be master of the control bus. This processor is designated by placing it in the slot closest to the bus arbitration module. One pin of this connector is grounded, enabling the processor to function as a master of the control bus. With this one exception, all bus locations are identical. The control bus is an asynchronous bus and all communications are handled on a request/grant basis.

Shared Memory Bus Priority Arbitration. There are four separate functions: the bus-request lines (BR$\emptyset$)-BR(N−1)), the bus-grant lines (BG$\emptyset$-BS(N−1)), the grant-acknowledge line (GACK), and the bus-locked (LOCK) line. The number of bus-request lines and bus-grant lines corresponds to the number of priority levels used. Eight lines are used in the design example and this appears to be the optimum choice. However, the number can be readily changed if required. The daisy-chain connection of the bus-grant lines causes the priority of a given module to be a function of position on the bus. By blocking the propagation of a bus-grant signal, a module can deny a "down-stream" module access to the bus.

Access to the bus is handled by circuitry on the processor modules and by a bus arbitration module (BAM). The BAM is connected at one physical end of the bus. The position next to the BAM is the highest priority for each of the request-grant line pairs and is used by the control processor. Operation of the arbitration scheme is as follows: A processor module which desires access to the bus will assert one of the bus-request lines, the choice of request line being determined by the nature of the transfer. Selection of the request line is handled by the virtual machine, not by an application task. If no higher priority is asserted, and if no module located closer to the BAM on the same line has requested the bus, then the BAM will assert the corresponding grant line and the grant will not be blocked before arriving at the processor. Upon receiving the bus request the processor asserts GACK and has acquired the right to be the next user of the bus. As soon as the present bus user (if any) clears LOCK, the processor asserts LOCK and proceeds to use the bus as desired. When it has completed bus activity, it first clears GACK, thus enabling the BAM to assert the present highest bus-grant line, then clears LOCK, thus giving up the bus. If possible the processor should clear GACK in anticipation of giving up the bus, allowing the next arbitration sequence to proceed early, giving better bus utilization.

Figure 3:
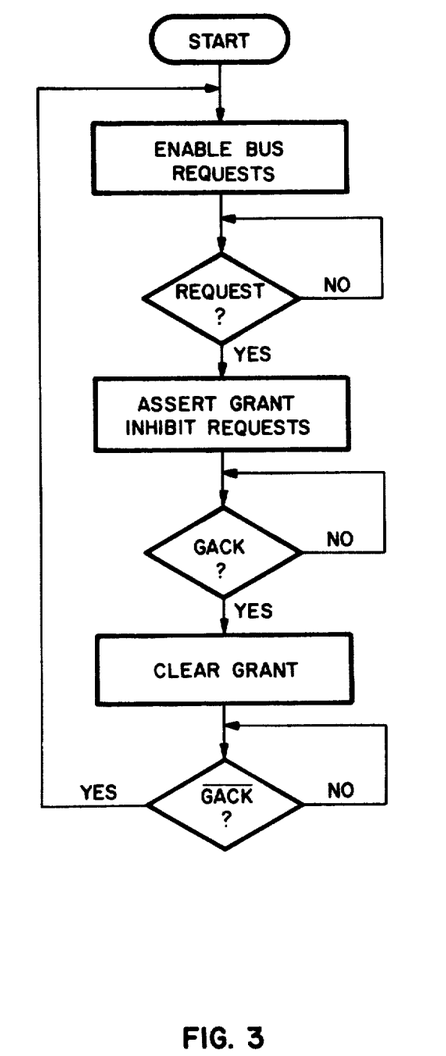
FIG. 3 is a flowchart of the bus arbitration module.

A flowchart of the operation of the BAM is shown in FIG. 3. While the bus arbitration sequence itself is asynchronous, the BAM operates as a synchronous finite-state machine clocked by the processor clock. Most of the BAM logic is implemented with three MSI packages. The logic for the next state signals and the output decode is SASI (three 3-input NAND gates). Two D type flip-flops (1 package) are used to provide the state variables. The total package count for the BAM (for N=8) is seven 16-pin packages.

Figure 4:
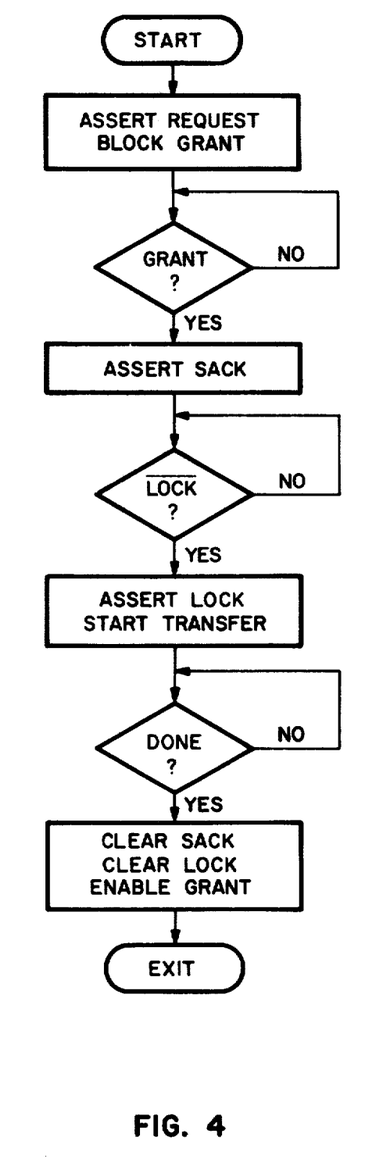
FIG. 4 is a flowchart for operation of processor module priority logic of the bus arbitration logic.

A flowchart of operation of processor module portion of the bus arbitration logic is shown in FIG. 4. While this logic is also a finite-state machine, it differs from the BAM in that it is implemented in software and firmware as well as hardware.

The bus-request and bus-grant lines are assigned by function. In general, the write requests have a higher priority than the read requests. All N-cycle requests are scheduled at a higher priority than K-cycle requests. A special priority request line is provided for exceptions. The highest priority is reserved for the control processor. Sample assignments, for N=8, are:

| BUS REQUEST | PRIORITY | ASSIGNMENT |
| --- | --- | --- |
| BR0 | 0 | Used by the control processor for both read and write operations. |
| BR1 | 1 | ATM Priority Write. Used by ATM to write control information into shared memory. |
| BR2 | 2 | ATM Priority Read. Used by ATM to obtain control information from shared memory. |
| BR3 | 3 | N-Cycle Write. |
| BR4 | 4 | N-Cycle Read. |
| BR5 | 5 | K-Cycle Write. |
| BR6 | 6 | K-Cycle Read. |
| BR7 | 7 | Distributed Cache Read. Used to obtain bus to read cache memory. More than one processor may be granted this request at one time. |

The Applications Task Manager. The ATM controls the execution of all application programs. It is an integral part of each processor module and of the MMCS architecture. The ATM is implemented in both microcode and native code (which may be compiler generated).

ATM Functions. (a) Handle allocation of all shared resources; (b) handle scheduling of all tasks; (c) implement the virtual machine used for system communication; (d) Provide a structure for isolating applications programs from hardware details so that changes in the hardware do not require the applications programs to be rewritten; (e) Provide the means by which the system may be initialized after a cold start; and (f) provide diagnostic tools for debugging programs.

Figure 5:
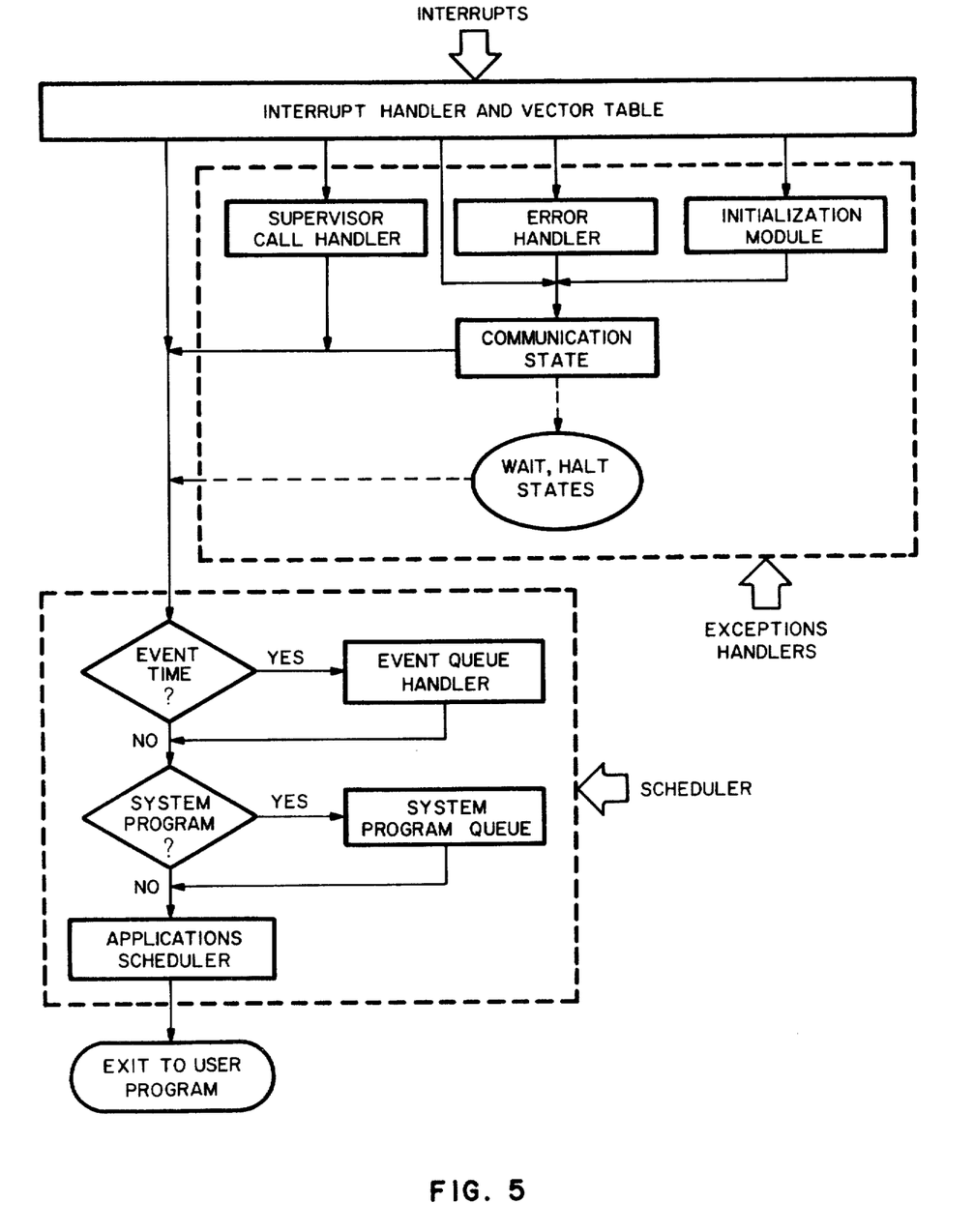
FIG. 5 is a flowchart of the applications task manager.

Basic Concepts. Entry into the ATM is always by an interrupt or trap (or software interrupt). Upon entry to ATM the initial activities are to determine the type of interrupt and to set the ATM flags and queue pointers appropriately. Normally control is passed directly to the scheduler which assigns a starting time to the desired task. However, under some conditions an exceptional task may be activated. Exceptional tasks include (a) the supervisor call (SVC) handler; (b) the error handler; (c) the cold-start initialization routine; and (d) the communications state of the virtual machine. When the exceptional task is complete, control is passed to the scheduler as in a normal interrupt. Exit from the ATM is always to the scheduled application task. In the event that no applications task is currently ready to run, a diagnostic task can be scheduled. No specific provision is made for implementing a background task since the same effect is achieved by scheduling a task at the lowest priority with unlimited time. The diagnostic task, if present, would be handled in this manner. In the event that no task is ready to run, the ATM will schedule a null job. A complete flowchart of the operation of the ATM is given in FIG. 5.

Several of the key features of the ATM may be observed, in particular:

(a) While ATM is activated by interrupts, these interrupts do not cause direct execution of any tasks. Instead they set certain ATM flags which allow passage of control to the scheduler. Thus, the scheduler always selects the task to be executed, regardless of the interrupt type.

(b) Exit from ATM is always to the task selected by the scheduler.

MMCS Interrupts. The processor modules of the MMCS have six classes of interrupts, of which five are handled by the ATM. The six classes are defined below:

CLASS 1) SYSTEM LEVEL INTERRUPTS

These interrupts are used for events which affect the entire system. They are part of the system bus structure and cannot be masked by the processors. They may originate from the control processor or from the external world. Examples of the use of system interrupts are the power-fail routine and the system "freeze" function.

CLASS 2) COMMUNICATIONS REQUEST INTERRUPTS

These interrupts cause the processor module to go to the communications state and acknowledge the request. The interrupting device may then initiate the desired exchange.

CLASS 3) ERROR TRAPS

These interrupts occur as the result of an attempt to violate system policy. They cause an error handler to be started.

CLASS 4) ATM TIMER INTERRUPTS

These interrupts are the result of an ATM timer and are used by the ATM for scheduling purposes. They are the normal cause of entry to ATM.

CLASS 5) ATM ASSIGNABLE INTERRUPTS

These interrupts cause a specific task to be flagged to run and can be assigned by ATM.

CLASS 6) APPLICATIONS INTERRUPTS

These interrupts are controlled by the applications programs. They do not cause entry to ATM and are masked whenever ATM is active. A given interrupt is associated with a specific task and is unmasked only when that task is active. Assignment of these interrupts is done by a supervisor call to ATM.

The priority of the interrupts is highest for class 1 and lowest for class 6. Within a given class the interrupts are prioritized if there is more than one.

The Interrupt Handler and Vector Table. The interrupt handler and vector table handle class 1 through class 5 interrupts and the overhead associated with entry into ATM. If possible, each interrupt is assigned a vector in the vector table for the fastest possible response. The class 1, class 2, and class 3 interrupts, which cause specific exceptional tasks to be activated, are always serviced immediately. The class 4 interrupts, whose primary purpose is to activate the scheduler, do not cause specific tasks to run but can effect flags in the scheduler. The class 5 interrupts flag specific tasks to be run and activate the scheduler.

The chief overhead task is to handle the possibility of the ATM being interrupted. Most interrupts are disabled while the ATM is active but some class 1, class 2, and class 3 interrupts are never masked. If the ATM is interrupted, a flag is set so that the previous activity is completed before exiting to an application program.

Supervisor Call Handler. The virtual machine implemented by the ATM provides a group of services to the application tasks. These services are in the form of new instructions at the task level. The mechanism by which they are invoked is the supervisor call (SVC). A task issues a SVC by use of a softward interrupt (or trap) instruction followed by the code for the desired supervisor call. The ATM vectors this request to the supervisor call handler where it is decoded and executed. At completion of the SVC, the ATM is exited through the scheduler.

The Error Handler. The error handler identifies the error code and prepares a message to be passed to the communications state. Other information, such as the machine state or the identity of the active task, is supplied where appropriate. This information is passed to the control processor. The task may or may not be restarted, depending upon the severity of the error. Control is always passed to the scheduler after leaving the communications state.

Initialization Routine. Application of reset or cold-start interrupt causes the initialization program to be run. After the system is initialized, control is passed to the communications state. The ATM remains in this state until it receives a command from the control processor (or, in the case of the control processor, from the external world).

The COMMUNICATIONS, HALT, and WAIT States. These three states have previously been described as a part of the virtual machine. A processor module enters the COMMUNICATIONS state upon receiving a class 2 interrupt. Typically two class 2 interrupts are provided, one maskable and one non-maskable. The maskable interrupt is used for routine requests and does not cause the processor to suspend a critical task. When the processor enters the COMMUNICATIONS state it asserts the output handshake line to indicate that it is ready. If the control processor initiated the request, it will then send the first word of the message and assert the input handshake line which clears the output handshake line. When the processor reads the word it again asserts the output handshake line, clearing the input line in the process. This sequence continues until entire message has been sent. If the processor is the initiator, it waits until the input line is asserted and then outputs a word to the control bus. Again, the process continues until the entire message has been transmitted.

The messages exchanged by processor modules in the COMMUNICATIONS state have the format opcode, operands, terminator and are interpreted by the virtual machine.

The HALT and WAIT states are normally entered as a result of a command sent as a part of a message. However, the status and control register of each processor module also contains a hardware halt bit.

Scheduler. The scheduler handles all tasks other than exceptional tasks. It also handles all time-dependent functions for the processor. The scheduler is described in detail in a section to follow.

ATM Time-Keeping Functions. During normal operation the ATM maintains three time-dependent activities. These are the cycle-clock counter, the task timer, and the event alarm timer. The cycle clock is the external timing signal fed to each module for synchronization. The cycle clock sets the rate at which shared memory read/write cycles may occur. Because a given processor module may not have to access shared memory every cycle, a counter is used to provide an interrupt at the desired intervals. After each interrupt, the cycle counter is first loaded with the number of cycles before the next interrupt and then enabled. It is driven by the cycle clock which is available on the system bus.

The event timer and the task timer are both driven by the system clock, which is also available on the system bus. The system clock is the reference for all time dependent activities. The period of the system clock sets the lower limit for the time resolution in the MMCS. The event timer is used to generate an interrupt at the time of the next scheduled event. This interrupt also sets a flag which informs ATM that the event queue—a queue of all scheduled events—should be checked. Each time the event queue is checked, the present event is removed and the corresponding task activated. The event timer is then loaded with the time available until the next scheduled event. If desired, the functions of the cycle-clock counter may be implemented by use of the event timer. This is a more general technique but may cause slightly more overhead.

The task timer is used to control the amount of time consumed by an active task. When a task is started its associated time limit (if any) is loaded into the task timer. The task timer counts down as long as the system is in the user mode (it is inhibited while the ATM is active). If a task is swapped out (preempted) before its time is up, the time remaining is saved and restored when the task is restarted. The task timer may be an actual timer or it may be implemented as an event on the event timer.

Application and System Program Tasks. ATM supports two types of tasks, application tasks and system tasks. The application tasks, as the name suggests, support the application assigned to the processor module. System tasks (or, equivalently, system programs) are provided as a means of implementing executive functions that are matched to a particular application. System programs have the following characteristics: (a) System programs run to completion. They are not preempted except by their own time limits. (b) All system programs that wish to run do so when ATM is entered. (c) System programs have access to all processor resources. (d) The highest priority system program (the one that runs first in view of point) can be flagged to run by the cycle clock counter interrupt. (e) A system program can be caused to run by a class 5 (assignable) interupt.

System programs are allowed in order to make the ATM as extensible as possible. However, these are to be used as application-dependent parts of ATM, not as higher-priority application programs.

Tasks States. The possible task states are ACTIVE (RUNNING), READY, SUSPENDED (BLOCKED), and TERMINATED (DORMANT). An active task is the one which a processor is presently executing; a given processor module can have only one ready task. A terminated task is one which either has never been scheduled to run or has run to completion. A processor module can have more than one terminated task. A suspended task is one which has previously been running and has terminated itself when a specific event occurred. For example, a task may issue a supervisor call to pause for a time interval or to pause until specific conditions have been satisfied. When the conditions for restarting the task are satisfied, the task is placed in the ready-state and executed as soon as it becomes the highest priority task. A processor module may have more than one suspended task.

The ATM Scheduling Mechanism. ATM uses a single-level dynamic priority assignment and preemptive scheduling with resumption. This implies that it is possible to interrupt the execution of a task to run a higher-priority task. The interrupted task can be continued later when the higher-priority task terminates. When more than one task wishes to run, the highest-priority task is chosen. If two tasks have the same priority, they are executed in the order of their requests. The priority of a task can be changed after the task is created and loaded into the processor module. Normally, this would be done by a higher priority task rather than the task involved. ATM provides a supervisor call to modify task priority but never changes a priority without external direction because the priority of a task is considered to be a user-controlled policy and not a system function.

The Scheduler. The three main components of the scheduler are the event queue handler, the system program queue, and the application program scheduler.

The Event Queue Handler. The event queue is the mechanism used to handle all events scheduled to occur either at some specific time or after an elapsed time. The entries in the event queue consist of a time and a pointer to a task. All times are absolute, the relative times having been added to the present time at entry. The entries are sorted by value with the "top" of the queue containing the first time. When the event timer interrupt occurs, the event queue handler is flagged to run by the interrupt handler. When the scheduler is entered, the task pointed to by the entry at the top of the queue is activated and this entry is removed from the queue. This does not mean that the task begins execution at this time, but only that it is able to compete for processor time. It executes immediately only if it is the highest priority ready task.

The System Program Queue. If any system program is flagged to run, the system program queue is searched and all ready programs are run. Since all system programs run, the use of priority does not have much meaning. However, there is a precedence in that the system programs are run in a well-defined order. The Application Task Scheduler. The application task scheduler compares the priority of the currently active application task with the highest priority task which is presently ready to run. The higher priority task is scheduled to run and control is passed to that task. If no task is presently ready to run then control remains with ATM in a "wait for interrupt" mode, since the interrupt would be the only mode by which a task could be scheduled under these circumstances. This is the null job mentioned earlier.

There are five major data structures in the ATM, as follows: (a) Task Control Blocks (TCB); (b) Jobs Queue; (c) Event Queue; (d) System Program Queue; and (e) Ready Task Queue (RTQ).

The Task Control Block. All of the information which the system needs about a task is contained in a group of parameters called a task control block (TCB). The TCB contains the following parameters: (a) ID Tag, (b) Priority, (c) State Flags, (d) Time Limit, (e) Time Limit Storage, (f) Starting address, (g) Ending Address, (h) Stack Pointer, (i) Stack Pointer Storage, and (j) RTQ Pointer.

The ID tag is a number from 0 to 255 used to identify a particular task. The priority is a number between 0 and 255 (0-highest, 255-lowest) used to determine scheduling precedence. The ID tag must be unique, but the same priority may be assigned to more than one job. Jobs of equal priority are serviced in the same order that they are entered. The state flags denote the state of the task at any given time. In addition, some of the state flags are used to provide inputs to the scheduler. The time limit is the maximum amount of time the task is allowed to run each time it is scheduled. This value may be changed by a supervisor call. A value of zero is interpreted as unlimited time. A second location is provided to store the elapsed time if the task is interrupted. The starting and ending addresses indicate the limits of the memory occupied by the task. The stack pointer is the initial value of the stack when the task is started. The second location is used to store the stack pointer if the task is interrupted. The RTQ pointer gives the location of the task in the ready task queue.

The Jobs Queue. The jobs queue is used to find the TCB or RTQ entry (the ready task queue is described in a following section) of a given job. It is organized by ID tag and contains the following items for each entry: (a) ID tag, (b) Priority, (c) RTQ pointer, and (d) TCB pointer. The jobs queue is relatively static so changes are made by physically adding or deleting entries. The ATM is designed such that the jobs queue could be changed to a linked structure later if necessary.

The Event Queue. Entries in the event queue are keyed to the event time, which is also given as an absolute time referenced to the system time base. The event queue consists of a linked list of entry blocks, a stack containing pointers to all empty blocks, a pointer to the current top of the queue (next event), and pointers delimiting the area of memory containing the entries. Each entry in the queue contains the following parameters: (a) the event time; (b) an opcode defining the nature of the event; (c) operands as necessary; (d) a foward pointer; and (e) a backward pointer. The linked-list structure is used to reduce the time necessary to search, sort and modify the queue. However, as entries are added and deleted the queue becomes sparse due to the embedded empty blocks. Eventually the queue must be compacted ("garbage collection") to recover these blocks. In the MMCS these high overhead periods may interfere with the running of time critical tasks and must be avoided. To remedy this problem a stack containing pointers to all empty blocks is utilized. When an entry is added to the queue, it is placed in the location pointed to by the top of the stack and the stack is popped. When an entry is removed from the queue, a pointer to this location is pushed onto the stack. This increases the overhead for each operation but eliminates the need for the high overhead compaction periods.

The System-Program Queue. Since the system-program queue is always searched in a linear fashion, it is in the form of a simple array. Each entry of the array contains the following items: (a) ID tag; (b) service request flag; and (c) pointer to task control block.

The Ready Task Queue. The RTQ is used by the application task scheduler to select the highest priority ready task. The structure of the RTQ is the same as the event queue except for the following differences: (a) Entries in the RTQ are organized by prioirty rather than time. (b) The RTQ contains a pointer to a specific TBC rather than an opcode and operands. This is less general than the event queue but has less overhead. Because MMCS tasks are relatively static only a single priority is used. This decreases the overhead in searching the queue but increases the difficulty of making additions and deletions to the queue. As with the system-program queue, provision for modifications has been made by maintaining a separate queue for each priority managed by a master priority pointer queue.

Each task has a service request flag which may be located in the TCB or the RTQ. The choice is a function of the processor on which the ATM is implemented.

ATM Implementation Requirements. The minimum hardware requirements to implement the ATM are: (a) an ability to implement the three timekeeping functions (cycle counter, task timer, and event timer); (b) an ability to handle the required number of interrupts; the actual number is dependent upon the complexity of the system but 24 is typical; (c) a software interrupt to handle the supervisor calls and error traps; and (d) an ability to protect the system memory while in the user state. The three timekeeping functions could be handled by a single hardware timer using an "alarm" mode of operation, but this would result in a large amount of overhead. A significant reduction in overhead can be obtained by utilizing vectored interrupts to eliminate the need for polling. The software interrupt (or software trap) is required to allow the use of a consistent means of entry to ATM and to ease problems of memory protection. The software interupt also gives a controllable entry into the system area for user programs. If these features are not required then the software interrupt is not required. The fourth requirement, an ability to protect system memory, can be implemented externally if necessary.

A major enhancement to the minimal hardware requirements would be to implement a number of functions directly in microcode. Because microcode working registers do not have to be saved across instruction boundaries, ATM could be used without having to save the status of the current user program. Most of the interrupt service functions could also be implemented in microcode. An alternative would be to use a processsor which has multiple sets of working registers and flags and assign one set to ATM.

ATM Supervisor Calls. The SVC requires the use of a "software interrupt" instruction to gain entry to the SVC handler portion of the ATM. The SVC itself follows the software interrupt instruction and consists of an opcode byte followed by operand bytes as required. The two most significant bits of the opcode byte, b7 and b6, are used for special functions leaving six bits for the actual opcode. This allows up to 64 different codes. However, the opcode 63 (all 1's) is reserved as escape, allowing for unlimited expansion. Use of the escape value indicates that the following byte is to be used as the opcode.

The most significant bit, b7, is defined to be the external bit. If b7=1 then the SVC refers to a task in a processor other than the one where the SVC itself is located. Where the external bit is set the opcode is followed by a logical unit number giving the address of the processor containing the task or parameter referred to by the SVC. Use of the external SVC requires cooperation between the processors involved and communication through shared memory. This would be set up at the time the tasks were loaded.

Bit b6 is used to denote a privileged SVC which has access to resources normally denied application tasks. This would normally indicate a SVC issued by a systems program. The ATM has SVC's for the following functions: (a) task management; (b) flag management; (c) interrupt control; (d) task control; (e) time management; (f) error handling; (g) resource allocation; (h) I/O and message services; (i) event control; and (j) memory management.

Extension of the Virtual Machine Concept. The virtual machine concept was used in defining relationships between the microcomputer modules in order to remove as many hardware dependent details as possible. The same concept may be extended to cover the relationship of the MMCS and the application. This extension of the virtual machine is implemented by the control program.

The System State/Frame Period. The frame period defined in Section I (also referred to as a system state in the MMCS specifications) is determined by the characteristics of the system simulated on the MMCS. This frame period is a basic state of the virtual machine and is implemented by the application programs. To implement a system state or frame period, the MMCS uses a number of read/write cycles to the shared memory. The shared memory read/write cycles are the states of the physical machine (i.e., MMCS) on which the virtual machine is implemented. The number of cycles required for one frame is a function of the partitioning of the tasks and of the effectiveness of the control program. Efficient passing of parameters to and from shared memory can reduce the number of times a given parameter must be moved, thus increasing the availability of the shared memory bus.

Because the applications (and therefore the virtual machine) are scheduled synchronously, each frame period must have the same number of cycles or the cycle period must be variable. If the frame period has a fixed number of cycles, then the number used must be the maximum required for any frame. This is not the most efficient use of the bus since it increases the number of arbitration cycles. However, since the cycle is the basic state, it is very important in scheduling the passing of system parameters and this activity would be complicated by a variable length cycle. The solution is to set some upper limit on the number of cycles per frame period and to let the cycle length be multiples of the period thus formed. All cycles are then initiated on well-defined boundaries, but a given processor only initiates cycles as required and lengthens cycles in fixed increments.

The Control Processor. The four requirements are listed as control processor tasks: (a) schedule the various microcomputers; (b) establish the proper sequence of task executions; (c) coordinate data transfers between common memory and the various microcomputers; and (d) coordinate the input/output functions. The control processor may actually initiate these activities itself or it may delegate the activity to one of the application or I/O processors. In either case, the task is scheduled by the control processor, even though it may be performed locally. The control processor then exists as both a physical and a virtual machine. The physical machine implements the virtual machine by distributing the scheduling activities to other processor modules. This distribution of the control activity decreases the traffic on the shared memory bus and makes the MMCS more responsive; an even greater advantage is that the application programs are less dependent on specific MMCS characteristics.

Figure 6:
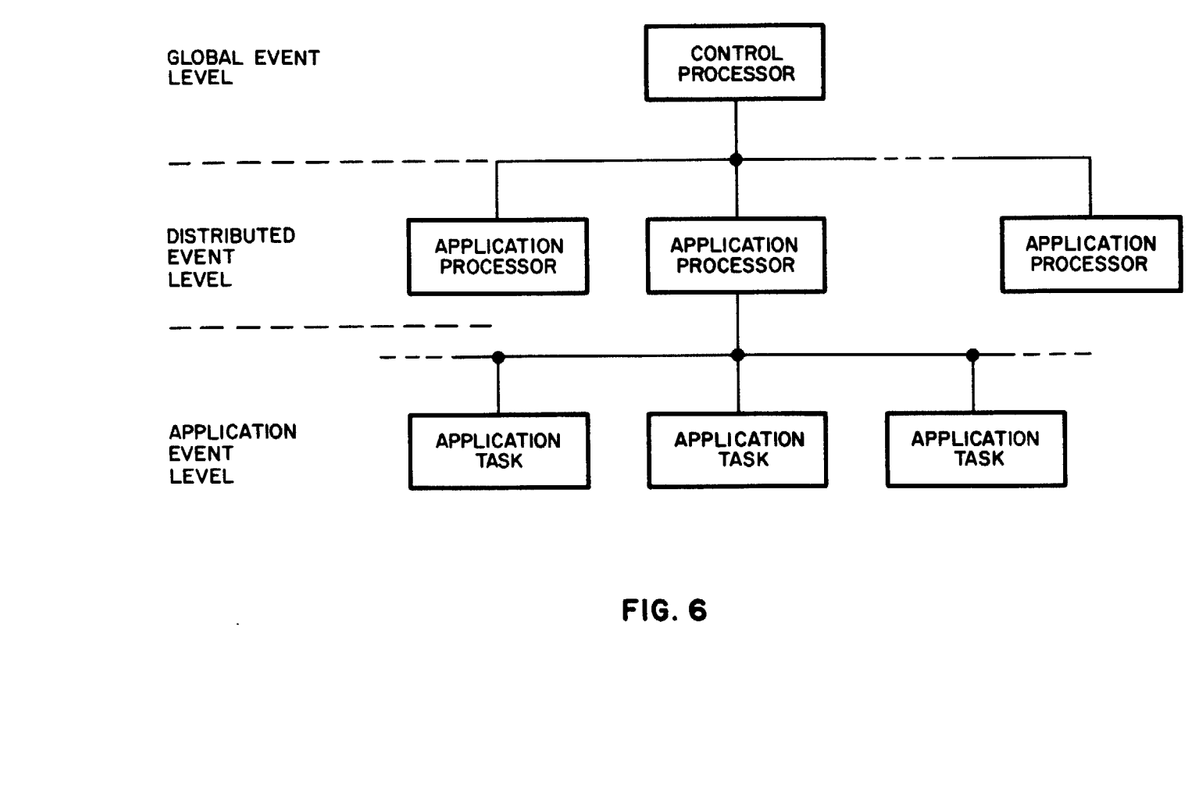
FIG. 6 is a block diagram showing the placement of event classes within the structure of a preferred embodiment.

The events scheduled by the control processor are classified as global, distributed, and application events. Their relative positions in the MMCS structure are shown in FIG. 6. The types of events are the same for all classes although certain types may be more likely to appear in one particular classification. Events may be scheduled on a synchronous, asynchronous, or exceptional basis. Events in any classification may be scheduled on any basis, although the distribution is not the same for all classifications.

Classification of Events. Global events are handled by the portion of the control program that resides in the control processor. Some typical global events are: down-loading information or programs to processor modules, executing system level dynamics, and handling errors at the system level. The events handled by the control processor are primarily exceptional events because routine activities are distributed among the other processor modules.

Distributed events are handled by processor modules at the system (ATM) level. Typical distributed events include the passing of parameters to and from shared memory and the initiating or terminating of tasks. This is the level where the bulk of the control program resides. Most of the tasks of the virtual control processor are handled at this level.

Application events are those which may be initiated by an application task or a device under the control of that task. Application events allow functions, such as I/O, to be handled outside of the control program. These events may make a disciplined use of system resources by use of supervisor calls.

Scheduling of Events. Synchronous scheduling of events takes less system overhead than asynchronous or exceptional scheduling. It is used for all events which occur on a periodic predictable basis. Multiple, related synchronous events must be sequenced so that precedence is preserved.

Asynchronous scheduling is used for tightly coupled or nonperiodic events. When the producer (sender) of a parameter is asynchronous but the consumer (receiver) is synchronous, very little extra overhead is involved. For more tightly coupled situations where control or handshaking information must be passed, asynchronous scheduling can require substantial overhead. The application tasks are not allowed to directly modify each other so the communication between tasks is by the supervisor calls provided for this purpose. There are two types of supervisor calls which are useful in the asynchronous scheduling of events. One involves the use of discretes, which are flags that are modified or tested by the application tasks through the use of supervisor calls. A given discrete is assigned to a single task and only this task can modify (set or clear) the discrete. However, all tasks may test the discrete by using a supervisor call to return the value of the discrete or by using a supervisor call to suspend or terminate a task based on a specified value for the discrete.

The second type of supervisor call used in asynchronous scheduling is a semaphore. There are two possible operations on a semaphore v, SIGNAL (v) and WAIT (v), as defined in Section I. The variable v represents a memory location or locations. It is incremented by one when a task executes a SIGNAL supervisor and decremented by one (unless it is already zero) when a task executes a WAIT supervisor call. If it is already zero the task executing the WAIT will be suspended until the semaphore is incremented by a SIGNAL operation. This is done by placing an opcode and operands on the event queue, causing the semaphore to be checked after a specified time interval. If the semaphore is zero the process is repeated; otherwise the task is flagged as ready and runs when it has the highest priority. The intervals at which the system checks the semaphore are selectable. The semaphore is not owned by any one task and is the basic building block for more complicated operations. It also is a higher overhead activity than the discrete.

Both the discrete and semaphore supervisor calls can be used with tasks in separate processors, in which case they are maintained in shared memory. Operations on discretes or semaphores in shared memory request the bus by use of the priority request lines so their latency time is low. They do, however, add to system overhead as well as increase traffic on the shared memory bus. Exceptional scheduling is used for events which are outside of normal operation. An example of exceptional scheduling is the use of error traps or system alarms.

Control Program Operation and Structure. The control program is the software portion of the control algorithm. It represents the application-dependent (and user-accessible) portion of the control algorithm. To the greatest extent possible the operational portion of the control program (the synchronous and asynchronous events) is distributed among the various microcomputer modules. This reduces the traffic on the common buses and vastly increases the parallelism of the system. An implication of this is that the virtual control processor is more powerful than the physical control processor. The control program in each processor has three major parts: (a) the cycle program; (b) the distributed control program (supervisor calls); and (c) the exceptional event handlers.

The Cycle Program. Each processor of the MMCS has a cycle program. The cycle program is run as the highest priority system program and is the heart of the control program. The cycle program is initiated by an interrupt from the cycle counter. For each cycle there is a pointer to a queue of activities for that cycle, and the chief activity is to handle all the synchronous, distributed events that are to occur. This involves flagging the required application tasks to run and setting up the passing of parameters to and from shared memory. The queue for a cycle contains pointers to the task control blocks of the application tasks, making it simple to flag time to run. Each task has a time limit but the tasks usually terminate themselves with a supervisor call after they have produced the required result. Within a given cycle the precedence of the tasks is handled by priority. In some instances a chain of asynchronous tasks is initiated by the cycle program.

The passing of parameters is done by providing pointers to the proper lists to a system program that handles this activity. Bus requests are made by the cycle program and the bus grants are connected to assignable interrupts which cause the parameter program to run. Each time a bus grant is received the program is initiated and the ATM is entered. The parameter program uses the pointers supplied by the cycle program to make the actual transfer to or from shared memory.

The cycle program may also perform other tasks. The last task performed is one that loads the cycle counter with the number of cycles until the next interrupt. The design of the cycle program is such that speed is optimized at the expense of memory. It is also structured so that run-time changes are possible.

The Distributed Control Program. A significant portion of the control program is distributed among the application tasks in the form of supervisor calls, whose use for the asynchronous tasks has been discussed previously. In addition, some tasks may handle their own scheduling by suspending themselves for an interval of time. This allows a task to be scheduled asynchronously with very little system overhead. These supervisor calls constitute a substantial part of the control program.

The Exceptional Event Handlers. The ATM contains handlers for exceptional events such as errors. If required, these handlers may initiate a user task or communicate with the control processor.

Diagnostics. Each microcomputer module, including the control processor, has a diagnostic program which checks the system status to the greatest extent possible. This routine is made to run as a background task by giving it the lowest possible priority, but unlimited time.

System Initialization. To initialize the multiple microcomputer system a system manager uses the console connected to the control processor and an initialization program which runs on the control processor as a system program. The bulk storage device, typically a disk, is handled by the control processor and holds the programs for all processors, including the control processor. The control processor has a small disk-boot program in ROM which is used to load its programs from the disk. These programs are then used to load object code and operating parameters into the other modules. The control bus is used to down-load the code, leaving the shared memory bus free for other activities. As each processor is loaded, it is placed in the WAIT state. When all processors have been loaded the operator then starts the system when desired. The initialization program includes cold-start diagnostic routines also.

Control Processor Tasks. The major tasks handled by the control processor are: (a) initialization; (b) dynamic assignment of tasks; (c) system-level diagnostics; (d) system-level error handling; (e) timebase management; (f) keeping all system records; and (g) handling operator interaction. The major requirements of the control algorithm are included in tasks (a) and (b). Due to the distributed nature of the control algorithm, most of the run-time decisions take place in the application processors. Because the control bus is used for initialization it is possible for it to change the assignment of an application processor module during execution. This could be used to reconfigure the system or to keep a processor failure from interrupting a run.

Although each processor has its own diagnostic and error handling routines, these activities are handled at the system level by the control processor. The routines for this are application programs on the control processor. These programs are expected to be continually updated as a given application matures and to occupy a large portion of the resources of the control processor.

To reduce system overhead the main timebase is handled by the control processor. Once each frame it places in shared memory the present system time and the frame number. If possible, these values are assigned to the distributed cache to reduce the bus load. The system time is derived from the system clock available to every processor. This allows incremental times within the frame to be handled locally.

The other major control processor functions are record keeping and handling operator interaction with the MMCS.

Obviously many modifications and variations of the present invention are possible in light of the above teachings. It is, therefore, to be understood that within the scope of the appended claims the invention may be practiced otherwise than as specifically described.

What is claimed is:

1. A processor that is an electronic machine for automatically manipulating data in accordance with a programmed task that is partitionable, comprising:
   a first microprocessor having memory, adapted to independently process data in accordance with a first portion of said task automatically;
   a second microprocessor having memory, adapted to independently process data in accordance with a second portion of said task automatically;
   first means interconnecting said first microprocessor and said second microprocessor for communicating data;
   second means interconnecting said first microprocessor and said second microprocessor for conveying machine instructions;
   means coupled to said first interconnecting means and to said second interconnecting means for providing global memory storage of data in computer processing format accessible to said first microprocessor and said second microprocessor;
   means coupled to said first interconnecting means and to said second interconnecting means for controlling interactions between said first microprocessor, said second microprocessor, and said storage means;
   means electronically immediately adjoining said interaction controlling means, coupled to said first interconnecting means and said second interconnecting means for controlling processor functions through action as master of said second interconnecting means;
   wherein selected portions of the data stored in said global memory means are duplicatively stored in said memory of said first microprocesor and pertain to said first portion of said task, and other selected portions of the data stored in said global memory means are duplicatively stored in said memory of said second microprocessor and pertain to said second portion of said task.

2. The processor of claim 1, wherein said function controlling means is a microprocessor and said interaction controlling means is a microprocessor.

3. A processor that is an electronic machine for automatically manipulating data in machine format in accordance with a programmed task that is partitionable, comprising:
   a first microprocessor with local memory, adapted to independently process data in accordance with a first portion of said task automatically;
   a second microprocessor with local memory, adapted to independently process data in accordance with a second portion of said task automatically;
   first means interconnecting said first microprocessor and said second microprocessor for communicating data;

second means interconnecting said first microprocessor and said second microprocessor for conveying machine instructions;

means coupled to said first interconnecting means and to said second interconnecting means for providing global memory storage of data in computer processing format accessible to said first microprocessor and said second microprocessor;

wherein selected portions of the data stored in said global memory means, which will hereafter be called said first selected portions of data, are duplicatively stored in said local memory of said first microprocessor and pertain to a first processing step in the solution of a predetermined task, and other selected portions of the data stored in said global memory means, which will hereinafter be called said second selected portions of data, are duplicatively stored in said local memory of said second microprocessor and pertain to a subsequent step in the solution of said task;

means coupled to said first interconnecting means and to said second interconnecting means for controlling interactions between said first microprocessor, said second microprocessor, and said storage means; and means adjacent said interaction controlling means, coupled to said first interconnecting means and said second interconnecting means for controlling processor functions through action as master of said second interconnecting means;

wherein said first microprocessor has a plurality of processor states in which it may be placed, and said first microprocessor includes means responsive to said function controlling means for selectively activating said first microprocessor between said states; and said second microprocessor has the same processor states available as said first microprocessor, and includes an activating means that is the same as the activating means of said first microprocessor for being responsive to said function controlling means for selectively activating said second microprocessor.

4. A processor that is an electronic machine for automatically manipulating data in machine format in accordance with a programmed task that is partitionable, comprising:

a first microprocessor with local memory, adapted to independently process data in accordance with a first portion of said task automatically;

a second microprocessor with local memory, adapted to independently process data in accordance with a second portion of said task automatically;

first means interconnecting said first microprocessor and said second microprocessor for communicating data;

second means interconnecting said first microprocessor and said second microprocessor for conveying machine instructions;

means coupled to said first interconnecting means and to said second interconnecting means for providing global memory storage of data in computer processing format accessible to said first microprocessor and said second microprocessor;

wherein selected portions of the data stored in said global memory means, which will hereafter be called said first selected portions of data, are duplicatively stored in said local memory of said first microprocessor and pertain to a first processing step in the solution of a predetermined task, and other selected portions of the data stored in said global memory means, which will hereinafter be called said second selected portions of data, are duplicatively stored in said local memory of said second microprocessor and pertain to a concurrent step in the solution of said task, in that said concurrent processing step is not dependent on the consequences of said first processing step as a prerequisite;

means coupled to said first interconnecting means and to said second interconnecting means for controlling interactions between said first microprocessor, said second microprocessor, and said storage means; and means adjacent said interaction controlling means, coupled to said first interconnecting means and said second interconnecting means for controlling processor functions through action as master of said second interconnecting means;

wherein said first microprocessor has a plurality of processor states in which it may be placed, and said first microprocessor includes means responsive to said controlling means for selectively activating said first microprocessor between said states; and said second microprocessor has the same processor states available as said first microprocessor, and includes an activating means that is the same as the activating means of said first microprocessor for being responsive to said controlling means for selectively activating said second microprocessor.

5. The processor of claims 3 or 4, wherein said task is the task of a real-time trainer that is divisible into a plurality of allocatable task modules, and each such module is assigned to a microprocessor such that said first microprocessor is operatively associated with a first of said plurality of task modules and said second microprocessor is operatively associated with a second of said plurality of task modules.

6. The processor of claim 5, wherein said processor comprises a third microprocessor and said task includes the same number of task modules as there are microprocessors, and said modules are assigned individually to separate said microprocessors such that each microprocessor is operatively associated with its respective one task module.

7. A real-time processor implemented in an assemblage of microprocessors that are individually tasked to perform a segment of a computing system program, comprising a plurality of microprocessors, a first transfer bus directly interconnecting said plurality of microprocessors, a second transfer bus coupled to each of said microprocessors, an arbitration microprocessor connected to a physical end of said first transfer bus, a control microprocessor connected to said second transfer bus and coupled to said arbitration microprocessor, and a separate storage means coupled to said first transfer bus for globally assessing data stored therein to said plurality of microprocessors, wherein said control microprocessor communicates on said second transfer bus to schedule said plurality of microprocessors, sequence task executions, and coordinate read and write functions on said first transfer bus, said arbitration microprocessor controls access to said first transfer bus, and said plurality of multiprocessors operate said program in accordance with predeterminedly allocated tasks.

8. A method of forming apparatus for electronically performing a task that involves an iterative process on computational data wherein the task is divisible into allocatable modules, comprising the steps of:
- dividing said task into program modules;
- adapting a microprocessor to process one of said modules, for each of said modules, including storing within each said microprocessor portions of said data pertaining to its associated task module;
- coupling said microprocessors together by a first transfer bus that is dedicated to the transfer of memory data, and by a second transfer bus for system control functions;
- providing for processing control information to said microprocessors by a separate control microprocessor coupled to said second transfer bus; and
- providing automatic interactions between said microprocessors, said shared memory, and said control microprocessor for data transfer;
- wherein the composite processing by said adapted microprocessors emulates a general purpose machine programmed to process said task in real time.

* * * * *